J. KANTOR.
SANITARY SUGAR CONTAINER.
APPLICATION FILED NOV. 10, 1913.
1,113,018.
Patented Oct. 6, 1914.
2 SHEETS—SHEET 2.
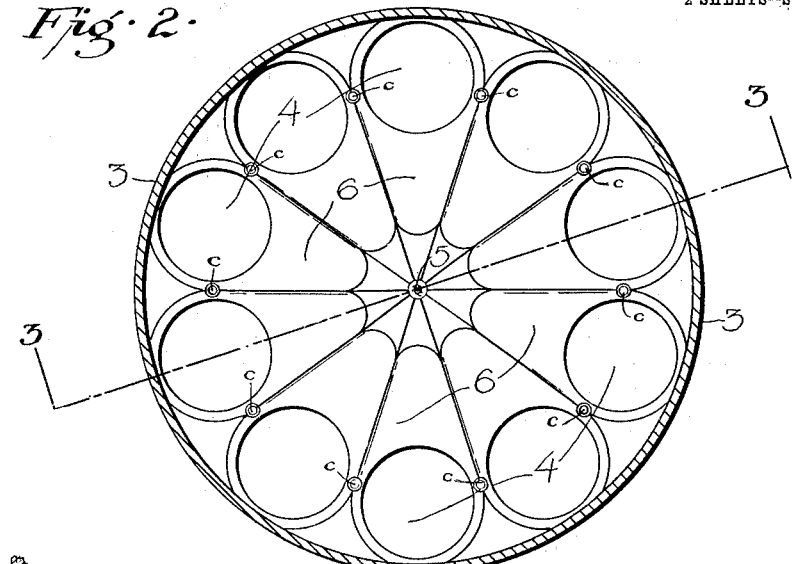
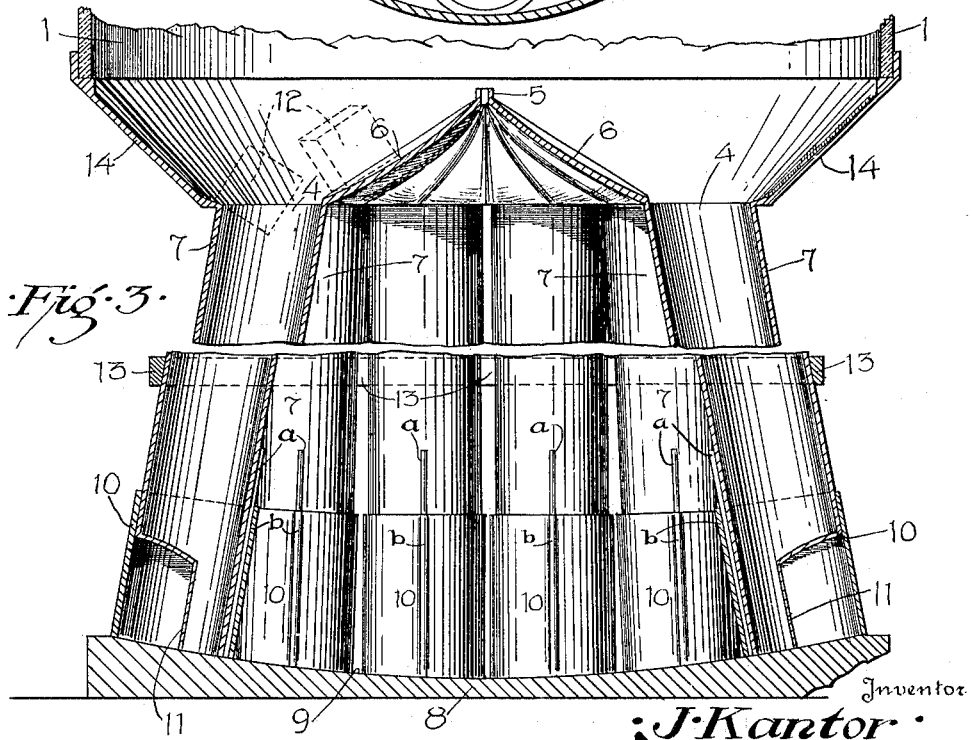
Witnesses
Inventor
J. Kantor
By
Attorney

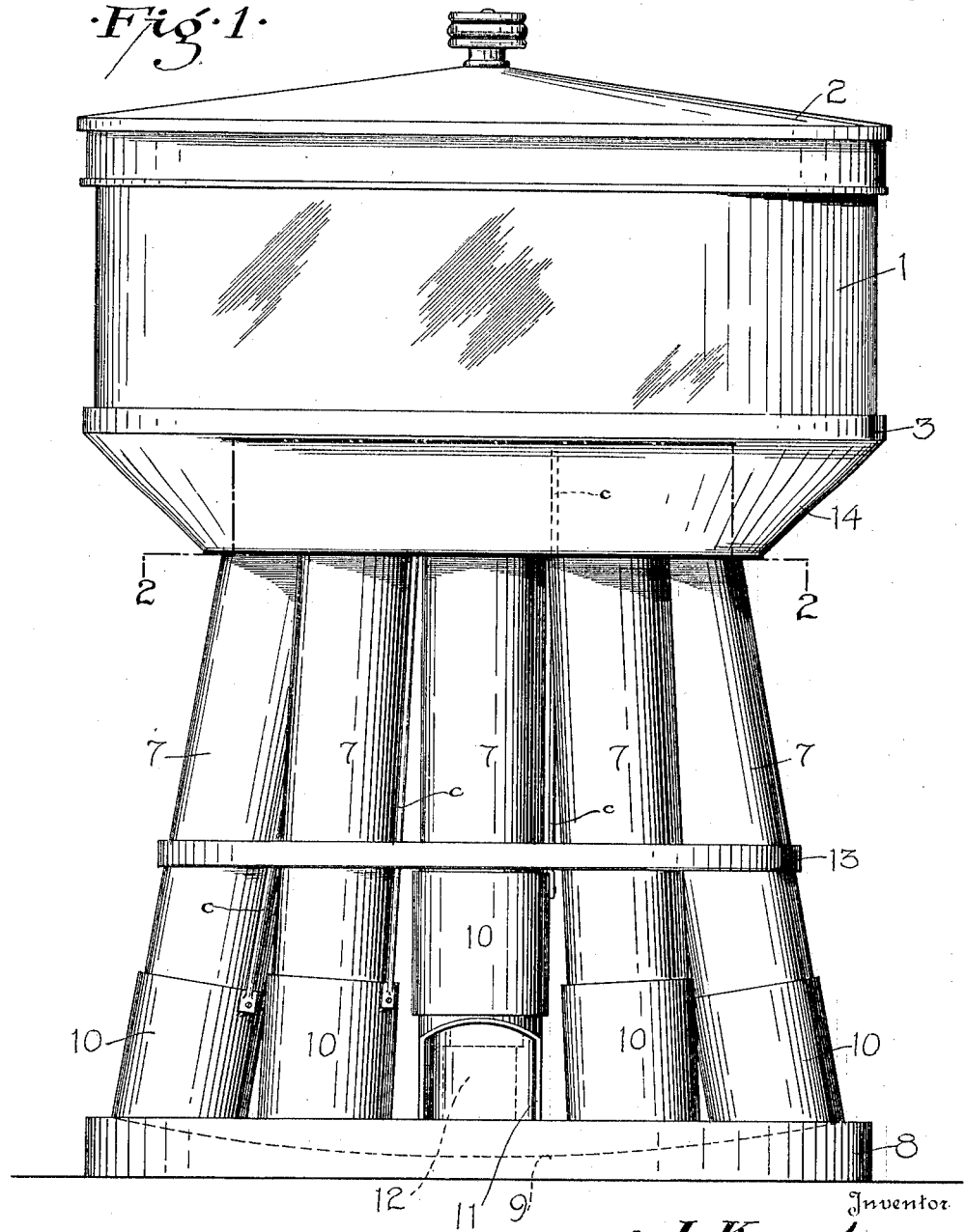

UNITED STATES PATENT OFFICE.

JOSEPH KANTOR, OF NEW YORK, N. Y.

SANITARY SUGAR-CONTAINER.

1,113,018.  Specification of Letters Patent.  Patented Oct. 6, 1914.

Application filed November 10, 1913.  Serial No. 800,131.

*To all whom it may concern:*

Be it known that I, JOSEPH KANTOR, a subject of the Czar of Russia, residing at New York city, in the county of New York and State of New York, have invented certain new and useful Improvements in Sanitary Sugar-Containers; and I do hereby declare the following to be a full, clear, and exact description of the invention, such as will enable others skilled in the art to which it appertains to make and use the same.

This invention relates to sanitary sugar containers designed for the purpose of holding out sugar in a sanitary condition in lunch rooms, coffee houses, restaurants and other places where food is dispensed.

It is the usual custom in dairy lunches and other places to display a large bowl of cut sugar on one of the counters. The customers coming in for luncheon usually help themselves to the sugar by taking up one or more of the lumps of sugar and it often happens that they will handle many pieces of sugar which they do not use. Moreover, this sugar is not protected from flies or from dust and flying particles in the air. As a result of this practice disease germs may be communicated from one person to another and the practice is uncleanly as well as unsanitary and unwholesome.

It is the purpose of my invention to improve this character of device and to render the use of sugar in the places referred to sanitary, cleanly and wholesome.

In carrying out my invention I make use of means for containing a quantity of cut sugar and means for feeding the lumps of sugar through tubes, or chutes, to a tray or base portion and to provide sliding covers which may be operated to produce one lump of sugar at a time upon the tray, thus permitting the customer to secure one lump of sugar at a time and as many as he desires without handling the other lumps of sugar in the container or in the other tubes.

In the accompanying drawings, Figure 1 is a side elevation of one form of container which I may use, Fig. 2 is a horizontal sectional view of the container taken on line 2—2 of Fig. 1, looking in the direction indicated by the arrow, Fig. 3 is a sectional view taken on line 3—3 of Fig. 2, looking in the direction indicated by the arrow.

While I have shown a certain form or contour or sugar container it will be understood that the general shape or form of the container may be varied within wide limits and may be made of other transparent material, like glass, or may be made of various metals.

As shown in the accompanying drawings the numeral 1 designates a container having a cover 2 and a support 3 for the container 1, which may be a section of glass tubing of sufficient size to contain three or four pounds, more or less, of cut sugar. The support 3 is provided with an annular series of perforations 4 and the central portion or apex 5 communicates with the perforations 4 by means of inclined curved guide ways 6, so that the lumps of sugar in the container 1 will by gravity drop through the perforations 4 into the discharge tubes 7, any number of which may be provided. These discharge tubes 7 at their lower ends are supported upon a tray 8 preferably provided with a concave upper surface 9. Mounted telescopically upon the lower ends of the discharge tubes 7 are tubular gravity covers 10. The covers 10 will be prevented from rotation and permitted to slide vertically by means of the guide wires $a$ which extend through tubular portions $b$ in rear of the cover, said wires being secured at the top to the container and at the bottom to the base. The lower ends of the tubes 7 are cut away as at 11 on their front or outer sides so that the lower lump of sugar 12 will rest upon the concave surface 9 of the tray 8 and be exposed when the cover 10 is lifted so that the user may remove the lower lump and permit the next lump above to drop upon the tray 8. A ring extends around the discharge tubes to hold them in place and said ring serves as a stop for the upper edge of the sliding cover to limit its upward movement in use.

The wall 14 of the container is inclined inwardly as shown to assist in feeding the lumps of sugar into the discharge tube 7.

To insure the feeding of the lumps of sugar from the container into the discharge tubes, a wire $c$ is connected to the side of each of the telescopic covers 10, and as the covers are lifted the upper ends of the wires will agitate the lumps of sugar in the container and assist in feeding the lumps into the tubes.

From the foregoing it will be obvious that a sanitary sugar container made in accordance with my invention will keep the sugar in a cleanly and wholesome condition and will not permit the handling of the various pieces of sugar by persons coming into a restaurant or lunch room, excepting in so far as the piece of sugar to be used by the person referred to.

My invention is simple in construction, may be made very ornamental or very plain, and serves its purpose in an effective and efficient manner.

What is claimed is:—

1. A sanitary container for cut sugar comprising a base, a container supported upon the base and a series of intermediate discharge tubes through which the sugar is deposited in single pieces at the lower end of said tubes upon the base or tray, and sliding covers for said tubes mounted telescopically therein, said tubes being cut away at their lower ends to give access to the lower lump of sugar in a discharge tube.

2. A sanitary container for cut sugar, comprising a base for a concave upper surface, a container provided with a cover, said container at its lower end having a conical central portion and a series of curved inclined guide ways, a series of discharge tubes communicating with the guide ways, telescopic covers at the lower ends of said discharge tubes, and a stop to limit the upward movement of said covers.

3. A container for cut sugar comprising a base, a receptacle for the sugar, having an internal conical portion provided with a series of radially inclined curved guide ways, a series of discharge tubes communicating with said guide ways, said tubes being cut away at their front lower ends to permit access to the sugar in single pieces, and telescopic covers adapted to be raised for giving access to the sugar.

In testimony whereof I affix my signature in presence of two witnesses.

JOSEPH KANTOR.

Witnesses:
 MORRIS FRISK,
 ADRAIN KELLEY.

Copies of this patent may be obtained for five cents each, by addressing the "Commissioner of Patents, Washington, D. C."